United States Patent [19]
Shipley

[11] Patent Number: 5,491,574
[45] Date of Patent: Feb. 13, 1996

[54] OPTICAL SIGNAL TRANSMISSION NETWORK

[75] Inventor: Simon P. Shipley, Aylesbury, England

[73] Assignee: GEC-Marconi Limited, United Kingdom

[21] Appl. No.: 496,659

[22] Filed: Jun. 29, 1995

Related U.S. Application Data

[63] Continuation of Ser. No. 187,637, Jan. 26, 1994, abandoned.

[30] Foreign Application Priority Data

Jan. 29, 1993 [GB] United Kingdom ............ 9301753

[51] Int. Cl.$^6$ ............................ G01N 21/00; H04B 10/08
[52] U.S. Cl. ................ 359/110; 356/73.1; 250/227.15
[58] Field of Search .......................... 359/110; 356/73.1; 250/227.15; 385/24, 31

[56] References Cited

U.S. PATENT DOCUMENTS

| | | | |
|---|---|---|---|
| 4,824,200 | 4/1989 | Isono et al. | 385/24 |
| 4,911,515 | 3/1990 | So et al. | 359/173 |
| 5,093,568 | 3/1992 | Maycock | 250/227.15 |
| 5,173,899 | 12/1992 | Ballance | 370/103 |
| 5,177,354 | 1/1993 | Tomita et al. | 356/73.1 |
| 5,187,362 | 2/1993 | Keeble | 356/73.1 |
| 5,214,725 | 5/1993 | Yanagawa et al. | 385/31 |
| 5,283,845 | 2/1994 | Ip | 385/24 |

FOREIGN PATENT DOCUMENTS

| | | |
|---|---|---|
| 0117868A1 | 9/1984 | European Pat. Off. . |
| 0432734A2 | 6/1991 | European Pat. Off. ............ 356/73.1 |
| 0499529A2 | 8/1992 | European Pat. Off. . |
| 2184231 | 6/1987 | United Kingdom . |

*Primary Examiner*—Jose L. Couso
*Assistant Examiner*—Bhaves H. Mehta
*Attorney, Agent, or Firm*—Kirschstein et al.

[57] ABSTRACT

Fault location apparatus is disclosed for use in an optical signal transmission network which comprises a main optical fibre having a plurality of branch fibres, and in which each final branch fibre of a chain of branches ends in a terminal unit. The fault location apparatus comprises OTDR equipment connected to the network so as to transmit an output signal through the main fibre and the branch fibres, and a filter incorporated in each of the final branch fibres. The filter is capable of reflecting back towards the OTDR equipment at least one wavelength in the OTDR band, but not traffic wavelengths. The OTDR equipment is operative to make measurements on the mirror or "virtual" image of the path from the terminal unit incorporating the filter returning a signal to the equipment.

7 Claims, 2 Drawing Sheets

OPTICAL SIGNAL TRANSMISSION NETWORK

This application is a continuation of application Ser. No. 08/187,637, filed Jan. 26, 1994 now abandoned.

BACKGROUND OF THE INVENTION

1. Field of the Invention

This invention relates to optical signal transmission networks, as may be used, for example, in optical fibre telecommunications, and relates, in particular, to a fault location and diagnostic systems for use with such networks.

2. Description of the Related Art

Over the past decade, optical time domain reflectometry, hereinafter referred to as OTDR, has become an established tool for the location and evaluation of the features on an optical fibre route. For example, OTDR techniques are now commonly used to determine both the position and loss of splices and connectors and the position of line breads as well as providing a means for making single-ended, real-time system loss measurements.

In use of an optical time domain reflectometer a short pulse of light is launched into an optical fibre under test and the backscattered signal is monitored as a function of the time of flight (or equivalently distance) along the fibre. The magnitude of the backscattered signal depends on the Rayleigh scattering, attenuation, inhomogeneities, splices, components and the optical power level in the fibre. Features in the trace of backscatter versus time may then be correlated with the presence of discontinuities and disruptions in the fibre route.

Whilst OTDR techniques are extremely valuable as a diagnostic tool for the location of faults in simple point to point links there is now an increasing trend towards more complex passive optical networks.

In such networks a number of branch circuits may emanate from a single optical fibre connected, for example to a telephone exchange, and the branch circuits may be further divided into further exchange, and the branch circuits may be further divided into further branch circuits, with each final branch circuit of a chain of branches ending in a respective terminal unit, for example at a customer's premises. Such an arrangement can provide a significant cost reduction by utilising the available bandwidth to share said single exchange fibre amongst a number of customers, thereby reducing the level of exchange equipment and fibre installation costs borne by each customer.

It will, however, be apparent that when a signal from OTDR equipment is transmitted along said single fibre, and thence to the branch circuits, the signal which is returned at any instant, following the transmission of an output signal from the OTDR equipment, will be made up of light backscattered from many points in the network at the same distance from the equipment. This makes the location of a fault in the network difficult and time-consuming.

SUMMARY OF THE INVENTION

An object of the invention is to provide a means of simplifying such fault location.

According to the invention in an optical signal transmission network comprising a main optical fibre having a plurality of branch circuits, with each final branch circuit of a chain of branches ending in a terminal unit, and the network being associated with OTDR equipment connected so as to transmit an output signal through the main fibre and the branch circuits, each said final branch circuit incorporates a filter which is capable or reflecting back towards the OTDR equipment at least one wavelength in the OTDR band but not traffic wavelengths.

The filter may be disposed in the traffic line itself, in which case it should be substantially completely transmissive to traffic wavelengths, or it may be located in a spur line connected thereto, in which case it may either transmit or attenuate traffic wavelengths.

In one embodiment of the invention the filters of the Individual final branch circuits are arranged to reflect back to the OTDR equipment a wavelength or wavelengths unique to that branch, and the OTDR equipment has means for distinguishing the signals returned from the individual final branch circuits.

Preferably, however, in accordance with a second embodiment of the invention, each filter is switchable from a first condition in which it transmits or attenuates wavelengths in the OTDR band, and a second condition in which it reflects wavelengths in the OTDR band, and means are provided for switching said filters individually into said second condition whilst maintaining the remaining filters in the first condition.

It will be seen that in each of these embodiments of the invention the route to any final branch circuit having a fault can be unambiguously identified, by the signals returned to the OTDR equipment.

Preferably In the second embodiment of the invention each said filter is located in or adjacent to the respective terminal unit. Such an arrangement has the advantage that a supply of power for actuating the switching of the filter will normally be readily available. Moreover it enables the filters to be easily interrogated and switched from the first to the second condition, avoiding the need for them to be constantly powered.

BRIEF DESCRIPTION OF THE DRAWINGS

The invention will be further explained by way of example with reference to the accompanying drawing, in which.

DETAILED DESCRIPTION OF THE PREFERRED EMBODIMENTS

Figure 1:
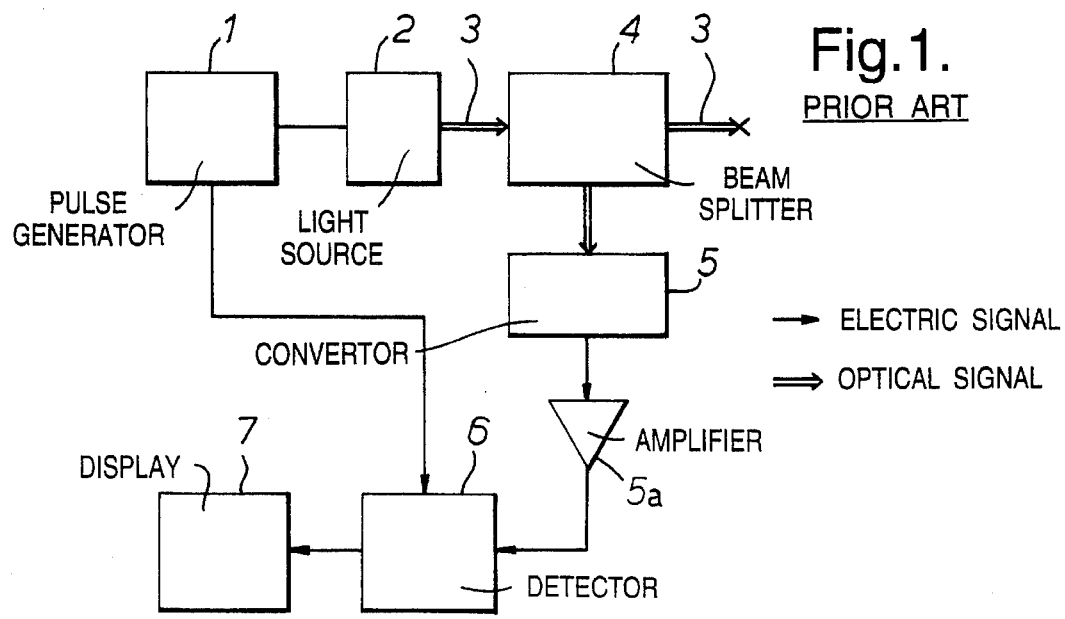
FIG. 1 represents in diagrammatic form a typical OTDR system.

Referring first to FIG. 1, the OTDR equipment illustrated comprises an electrical pulse generator 1, the output of which is fed to means 2 for producing a light signal in a selected waveband, and this is fed, in turn, into an optical fibre 3.

When a signal is generated by the OTDR equipment, a signal will be returned along the fibre 3 made up of light backscattered from splices, disconformities and possible faults in the fibre or in customers' equipment, the returned signal being fed via a directional coupler or beam splitter 4 to a convertor 5, amplifying means 5a and detector 6 responsive to the returned signal, and display means 7 for indicating the signal value, ie. after selected round trip delay times, and this accordingly enables the location of any fault in the fibre to be readily determined.

Such an arrangement would operate quite satisfactorily where there is only a single output fibre. However, where the fibre 3 has connected to it a plurality of branch circuits, as, for example in the case of an optical telecommunication system serving a plurality of customers' premises, the returning signal at any instant will be made up of light backscattered from many individual points at the same distance from the OTDR equipment, making the extraction of useful information from the equipment extremely complex.

Figure 2:
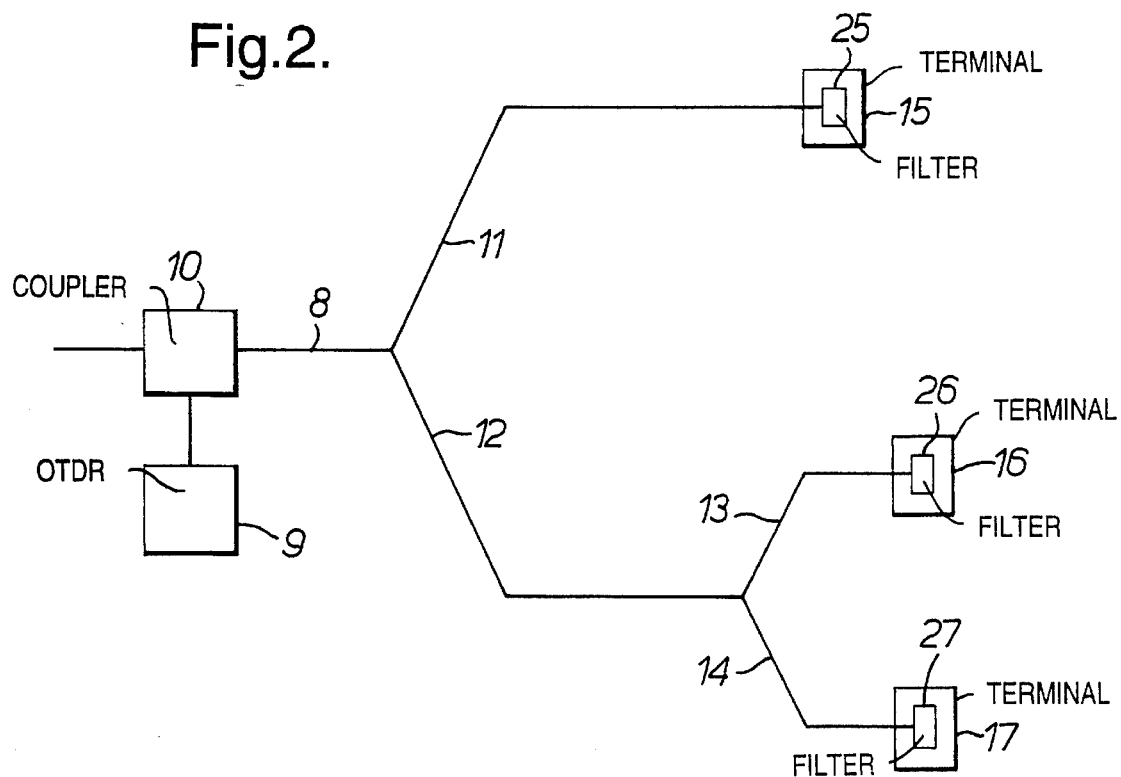
FIG. 2 represents part of an optical fibre telecommunication network incorporating the invention.

FIG. 2 illustrates how the invention avoids this difficulty, and represents, in simplified form, part of an optical fibre telecommunication network comprising a main fibre 8 connected to a telephone exchange (not shown) and feeding two branch circuits 11, 12. The branch circuit 12 feed, in turn, two further branch circuits 13, 14, and each of the branch circuits 11, 13, 14 terminate in respective customers' equipment designated schematically at 15, 16, 17.

OTDR equipment, shown diagrammatically at 9 feeds output signals into the fibre 8 through suitable coupling means 10, the signals being transmitted from the fibre 8 into the various branch circuits. In accordance with the invention each of the customers' equipment incorporates a switchable filter 25, 26, 27.

When in the "off" condition each of the filters is arranged to transmit all wavelengths fed along the respective branch circuits substantially completely so that there is no significant loss of traffic wavelengths (for example 1200 to 1570 nm) or of the OTDR wavelengths.

However each of the filters is arranged to be individually switched to an "on" condition by a respective interrogation signed in which it is substantially wholly reflective of the OTDR wavelengths, although still transmissive of all other wavelengths. Accordingly OTDR signals that are returned to the OTDR equipment are indicative of the state of the terminal branch containing the consumer equipment having the interrogated filter. If each of the filters is interrogated in turn it is a simple matter to isolate any faulty branch or branches, in dependence on the nature of the returned OTDR signals.

In use, when a reflector at distance d is "on", measurements are made on the mirror or "virtual" image of the path from terminal to the OTDR, ie. at distance d–2d, rather than in the "read" image at distance Q-d, this facilitating differentiating between returned signals.

The system has the advantage that, as the filters are located on customers' premises, power Is readily available to provide for Interrogation of the filters, thereby avoiding the need for separate power supplies to remote positions which may be necessary for such a purpose in cases where the filters were to be located in other parts of the branch network.

Figure 3:
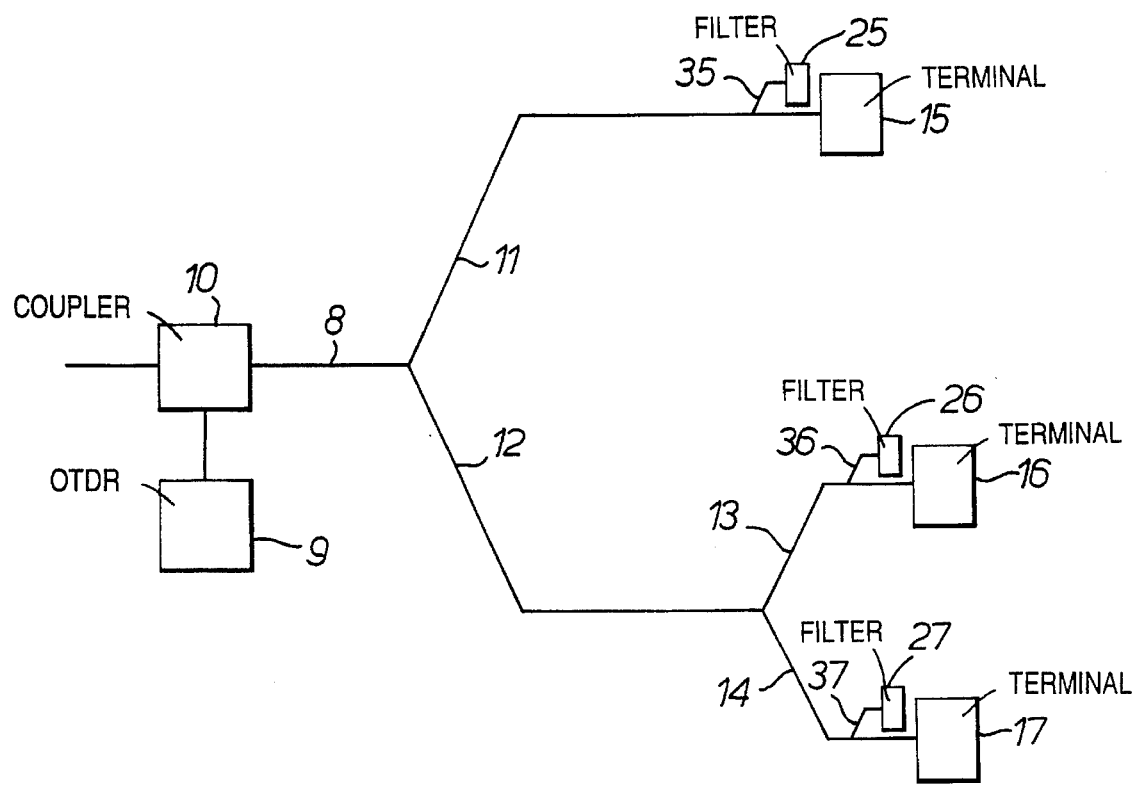
FIG. 3 represents a modification thereof.

FIG. 3 represents a modification of the network above described. In this case each of the filters 25, 26, 27 is disposed in a spur line 35, 36, 37 so that it does not pass traffic to the consumers equipment, but is similarly arranged to reflect back towards the OTDR equipment OTDR signals when appropriately Interrogated. Traffic signals can either be transmitted or attenuated, so that they are not reflected.

I claim:

1. Fault location apparatus for use in an optical signal transmission network which includes a main optical fibre having a plurality of branch fibres, in which each final branch fibre of a chain of branches ends in a terminal unit, said fault location apparatus comprising: optical time domain reflectometry (OTDR) equipment connected to said network so as to transmit an output signal through said main fibre and said branch fibres, and a filter incorporated in each said final branch fibre, said filter being operative for generating a reflected signal by initially reflecting the output signal back towards said OTDR equipment, said reflected signal being subsequently backscattered towards the filter to generate a backscattered signal, said filter being further operative for subsequently reflecting the backscattered signal towards the ODTR equipment, said OTDR equipment being operative to make measurements on the subsequently reflected backscattered signal.

2. The fault location apparatus according to claim 1, wherein said filter is disposed in a traffic line and is transmissive to the traffic wavelengths.

3. The fault location apparatus according to claim 1, wherein said filter is disposed in a spur line connected to a traffic line and is arranged to transmit or attenuate traffic wavelengths.

4. The fault location apparatus according to claim 1, wherein said filter in each said final branch fibre is arranged to reflect back to said OTDR equipment a wavelength or wavelengths unique to that branch, and said OTDR equipment has means for distinguishing said back scattered signals returned from said individual filters.

5. The fault location apparatus according to claim 1, wherein said filter is switchable from a first condition in which it transmits or attenuates wavelengths in the OTDR band, and a second condition in which it reflects wavelengths in the OTDR band, and further including means for switching at least one of said filters into said second condition while maintaining the remaining filters in said first condition.

6. The fault location apparatus according to claim 5, wherein means are provided for individually interrogating said filters, and for switching said filters, in turn, from said first to said second condition.

7. The fault location apparatus according to claim 1, wherein each said filter is located in or adjacent to said respective terminal unit.

\* \* \* \* \*

UNITED STATES PATENT AND TRADEMARK OFFICE
CERTIFICATE OF CORRECTION

PATENT NO. : 5,491,574

DATED : February 13, 1996

INVENTOR(S) : Simon P. SHIPLEY

It is certified that error appears in the above-identified patent and that said Letters Patent is hereby corrected as shown below:

Column 3, line 45, change "in the "read" image at distance Q-d," to
-- in the "real" image at distance 0-d, --.

Signed and Sealed this

Ninth Day of February, 1999

Attest:

Attesting Officer

*Acting Commissioner of Patents and Trademarks*